US012705334B2

(12) United States Patent
Stelling et al.

(10) Patent No.: US 12,705,334 B2
(45) Date of Patent: Aug. 11, 2026

(54) ZERO TRUST AUTHENTICATION OF SECURE SYSTEMS WITH TRUSTED PLATFORM MODULES

(71) Applicant: MPC Holding, Inc., New York, NY (US)

(72) Inventors: Olaf Stelling, Florence (IT); Cat-Tuong Le-Huy, London (GB)

(73) Assignee: MPC Holding, Inc., New York, NY (US)

( * ) Notice: Subject to any disclaimer, the term of this patent is extended or adjusted under 35 U.S.C. 154(b) by 94 days.

(21) Appl. No.: 18/746,451

(22) Filed: Jun. 18, 2024

(65) Prior Publication Data

US 2024/0419774 A1 Dec. 19, 2024

Related U.S. Application Data

(60) Provisional application No. 63/509,023, filed on Jun. 19, 2023.

(51) Int. Cl.
*G06F 21/44* (2013.01)
*G06F 21/57* (2013.01)

(52) U.S. Cl.
CPC ............ *G06F 21/44* (2013.01); *G06F 21/575* (2013.01)

(58) Field of Classification Search
None
See application file for complete search history.

(56) References Cited

U.S. PATENT DOCUMENTS 8,176,336 B1 5/2012 Mao et al.
9,491,261 B1 * 11/2016 Shagam ................ H04L 67/133
10,211,977 B1 2/2019 Roth et al.
11,418,329 B1 8/2022 Miller
12,149,626 B1 * 11/2024 Filsfils ................ H04L 63/0209
2006/0155988 A1 7/2006 Hunter et al.
2009/0086979 A1 4/2009 Brutch et al.
(Continued)

FOREIGN PATENT DOCUMENTS

CN 107077568 A * 8/2017 ........... H04L 9/0822
WO 2011031272 A1 3/2011
WO 2016081404 A1 5/2016

OTHER PUBLICATIONS

International Search Report and Written Opinion in PCT/US2024/034456, dated Oct. 7, 2024, 11 pages.

*Primary Examiner* — Benjamin E Lanier
(74) *Attorney, Agent, or Firm* — Barnes & Thornburg LLP

(57) ABSTRACT

Disclosed herein is a trusted platform module (TPM) for authenticating a secure system, the TPM including: one or more registers to automatically generate and maintain hash values indicating current state values of the TPM, secure memory to store a key in association with a secure system, and a processor in network communication with the registers and the secure memory. During a secure boot up process, the processor can perform operations including: deriving the key for the secure system from the hash values that are automatically generated by the one or more registers, calculating a Hash-based Message Authentication Code (HMAC) value using the key, generating, based on the HMAC value, an authentication login token for the secure system, and advancing the hash values that are maintained by the one or more registers from their initial state during the secure boot up process.

20 Claims, 8 Drawing Sheets

(56) References Cited

U.S. PATENT DOCUMENTS

| | | | |
|---|---|---|---|
| 2009/0169012 | A1 | 7/2009 | Smith et al. |
| 2010/0070769 | A1* | 3/2010 | Shima .................. H04L 9/3271 380/46 |
| 2012/0151223 | A1 | 6/2012 | Conde Marques et al. |
| 2017/0222802 | A1 | 8/2017 | Rubin et al. |
| 2018/0004954 | A1* | 1/2018 | Liguori .................... H04L 9/14 |
| 2018/0167203 | A1 | 6/2018 | Belenko |
| 2018/0294962 | A1 | 10/2018 | Kraemer et al. |
| 2020/0044863 | A1 | 2/2020 | Yadlin et al. |
| 2020/0204357 | A1 | 6/2020 | Seyfried et al. |
| 2021/0273921 | A1 | 9/2021 | Kumar et al. |
| 2021/0297259 | A1* | 9/2021 | Rahn .................... H04L 9/0897 |
| 2022/0038272 | A1 | 2/2022 | Hershman et al. |
| 2022/0350930 | A1* | 11/2022 | Dambal .................. G06F 21/80 |
| 2023/0155989 | A1 | 5/2023 | Kumar et al. |

* cited by examiner

ZERO TRUST AUTHENTICATION OF SECURE SYSTEMS WITH TRUSTED PLATFORM MODULES

INCORPORATION BY REFERENCE

This application claims the benefit of priority of U.S. Provisional Patent Application No. 63/509,023, filed Jun. 19, 2024, which is incorporated herein by reference in its entirety.

TECHNICAL FIELD

This document generally describes devices, systems, architectures, and methods related to zero trust and secure authentication of systems, such as hardware security modules (HSMs), with trusted platform modules (TPMs).

BACKGROUND

Multi-party computation ("MPC") techniques can include cryptographic protocol for distributing a computation across multiple parties where no individual party may see other parties' data. MPC techniques can be used for performing various operations and techniques, such as key management (enterprise key management solutions, or EKM) and secure transactions (e.g., cryptocurrency transactions) over networks, such as blockchains (a digitally distributed, decentralized, public ledger that can facility processes of recording transactions and tracking assets across a network). MPC techniques can allow multiple parties to jointly compute a function over their private inputs while keeping those inputs confidential. Such techniques can be used in a variety of operations, including but not limited to key generation, key agreement, key sharing, key update and rotation, key derivation, and/or key storage.

In the context of blockchain transactions, to transact over networks, such as blockchains, parties can establish wallets. A wallet is a type of blockchain wallet (e.g., crypto wallet) that requires more than one party to authorize transactions with assets to and from the wallet. The process of generating wallet keys and creating digital signatures can therefore be executed by different parties running a distributing computing protocol. A wallet typically consists of a public key (or address) and a private key. MPC techniques can be used to secure and authorize transactions involving the wallet, such as by requiring a threshold quantity of signatures to authorize a transaction.

HSMs can provide keys for executing the transactions that have been authorized. HSMs can provide an environment for executing the transactions or other types of functions or operations to be executed in a secure environment. The HSMs can provide for execution of transactions corresponding to keys, such as private cryptographic keys, without having knowledge of the actual keys being used to execute such transactions.

Zero trust environments provide security in the absence of any trust being established amongst network participants. In a zero trust environment, devices attempting to access a resource can be verified before access is granted. The verification may include multi-factor authentication and other security measures. Sometimes, devices can be granted minimum levels of access within the environment and/or the environment can be segmented into different zones to potentially limit lateral movement of malicious users and/or potential breaches. Additional security measures and/or authentication techniques can be performed to maintain the zero trust environment.

SUMMARY

This document generally describes devices, systems, architectures, and methods related to securing different types of systems with TPMs. The TPMs can be used, for example, to authenticate access to a secure system so that operations or functions may then be performed at the system. The disclosed technology can be implemented in zero trust environments to allow for scalability and increased security and trust in these environments. For example, TPMs can be used as described herein to securely perform authentication to any type of service and/or system (e.g., HSM, database, data store, system, server) and thus protect such service and/or system from being accessed by anyone. The TPMs can be used to prevent internal and/or external threats from accessing secrets (e.g., cryptographic keys) in HSMs (such as a bad internal administrator), as one illustrative example.

More specifically, the disclosed technology can provide for using TPMs, which are tied to an execution state of a machine such as a processing chip of the machine, to store secrets, such as cryptographic keys and to thus create a security layer for the secure system, such as the HSM. Where HSMs may typically perform key generation techniques, the TPMs can now execute signing rules for authenticating function calls and securing the HSMs. For example, a TPM can be a type of HSM embedded in a processing chip of a computing system (e.g., server). Cryptographic logic can be leveraged in the TPMs to secure cryptographic logic in the HSM and also to secure information, data, and/or transactions on a blockchain. The TPM can allow for specific types of operations to be executed that are provably secure. Functions (e.g., operations, software processes) that typically would be performed at the HSM now can go through the TPM using the disclosed technology, in which the TPM can act as an authenticator to the HSM.

The disclosed techniques can provide a cryptographically secure solution for EKM techniques, including but not limited to cryptographically secure solutions for any operations on a key that is in the HSM. Illustrative examples of these operations include signing a certificate (which creates a child certificate), performing a verify operation (which validates a certificate to be authentic), storing keys or other passwords, and/or other key management operations. The disclosed techniques can also be used in a variety of other applications, including but not limited to cryptocurrency transactions. Moreover, the disclosed technology can leverage zero knowledge techniques and signing, thereby enabling secure transactions without revealing sensitive information about cryptographic keys. Such techniques can enhance privacy and confidentiality in digital transactions, thereby mitigating risk of unauthorized access. Moreover, the zero knowledge techniques can ensure that sensitive information is never fully exposed, especially during a signing process.

Traditionally, to access an HSM or other secure system, authentication techniques may be performed on the HSM. Sometimes, it can be challenging to secure the HSM authentication techniques. For example, if the HSM is encrypted with an access password, then the access password may be stored outside of the HSM, which can create a security vulnerability of the HSM, if the access password is compromised. While the HSM can store information safely, the HSM may need to be administered and secured to ensure that the information stored therein remains secure. The disclosed techniques can leverage TPMs to authenticate and authorize access and a construct of the HSM.

The HSM or other system may protect itself with a PIN number, which can be used to execute the operations or functions at the HSM. However, the PIN may be insecure for the reasons mentioned above. If any unauthorized party gets a hold of the PIN, then security of the HSM may be compromised. The disclosed technology builds on top of the PIN mechanism of the HSM using TPMs. For example, when a user tries logging into an HSM for a first time with a known PIN for the HSM (e.g., to execute a function, operating, software process, transaction), the PIN can be parsed into protected memory of a TPM, the TPM being connected (e.g., wireless, wired) with the HSM. The TPM can check cryptographic characteristics of a function requested for execution by the user, authenticate or otherwise approve the function, then execute or run the function in a secure enclave of the TPM. The TPM can compute a randomized number to replace the PIN. The randomized number can be unknown to any user, system, and/or device. For example, the randomized number can be a 32-bit number. The randomized number can also be any other quantity of bits. Accordingly, the function (which can be intended for execution in the HSM) can execute/run in the secure enclave of the TPM with the randomized number and without human interaction. The TPM can leverage its secure enclave to generate the randomized number (e.g., an unknown secret or cryptographic key), which can cryptographically bind the TPM to the HSM and allows the software to secure the execution of the function on the HSM.

The disclosed technology provides an improved architecture and process flow that can permit for greater security and control over key management, storage operations, and transactions occurring over various networks and between different computing systems. For example, the disclosed technology can provide a secure key management system that allows parties to compute (and generate without storing) private keys that are used to sign operations, processes, functions, and/or transactions, which may be executed in any quantity of HSMs. These HSMs or other systems can be secured by TPMs, such that the operations, processes, functions, and/or transactions can be run on the TPMs instead of directly on the HSMs. HSMs are described as one illustrative embodiment and other systems can be secured with the disclosed technology and techniques. The disclosed technology and techniques can be used for authentication to any variety of systems, including but not limited to databases, APIs, memory caches, or other secure systems.

One or more embodiments described herein can include a trusted platform module (TPM) for authenticating a secure system, the TPM including: one or more registers that can be configured to automatically generate and maintain hash values indicating current state values of the TPM, secure memory that can be configured to store a key in association with a secure system, and a processor in network communication with the one or more registers and the secure memory. During a secure boot up process, the processor can be configured to perform operations including: deriving the key for the secure system from the hash values that can be automatically generated by the one or more registers, calculating a Hash-based Message Authentication Code (HMAC) value using the key, generating, based on the HMAC value, an authentication login token for the secure system, and advancing the hash values that can be maintained by the one or more registers from their initial state during the secure boot up process.

The TPM can optionally include one or more of the following features. For example, the operations may also include attempting an initial login of the secure system using a PIN value associated with the secure system, determining, based on the attempted initial login, whether a key exists in association with the secure system, and deriving the key from the hash values based on a determination that the key does not exist in storage in the secure memory. The current state values can include configuration and component information of the TPM that was recorded in the one or more registers at a time that the secure boot up process occurred. The secure system can include a hardware security module (HSM). Sometimes, the operations may also include receiving, from a client device via an API, user input to perform a function at the secure system and transmitting instructions to execute the function at the secure system in response to authenticating the secure system using the authentication login token.

One or more embodiments described herein can include a system for authenticating a secure system with a TPM, the system including: a secure system and a TPM in secure communication with the secure system. The TPM can include one or more registers and secure memory. During a secure boot up process, the TPM can be configured to perform operations including: attempting an initial login of the secure system using a PIN value associated with the secure system, determining, based on the attempted initial login, whether a key exists in association with the secure system, generating, based on a determination that the key does not exist, a key that can be associated with current state values of the TPM that can be maintained by the one or more registers, calculating a HMAC value using the key, and generating, based on the HMAC value, an authentication login token for the secure system.

The system can optionally include one or more of the following features. For example, the current state values can include configuration and component information of the TPM that was recorded in the one or more registers at a time that the determination was made. The current state values can include hashes of values indicating configuration and component information of the TPM. The operations may also include: logging out of the secure system, in response to generating the authentication login token and logging back into the secure system using the authentication login token. The operations may include advancing the one or more registers with arbitrary data to change the current state values from their initial values.

Sometimes, during another secure boot up process, the operations performed by the TPM can include: attempting a login of the secure system using the PIN value associated with the secure system, determining, based on the attempted login, that the key exists in association with the secure system, determining whether the current state values in the one or more registers are the same as during the attempted initial login at the secure boot up process, calculating, based on a determination that the current state values are the same, another HMAC value using the key, and generating, based on the other HMAC value, another authentication login token for the secure system. The other authentication login token can be different than the authentication login token. The other HMAC value can be different than the HMAC value.

The operations may also include: generating, based on a determination that the current state values are not the same as during the attempted initial login at the secure boot up process, another key that can be associated with current state values of the TPM that can be maintained by the one or more registers during the other secure boot up process. The registers may include PCR registers. The secure system may include a data store or database. The secure system may include a computer server. The secure system can be configured to perform operations on a function-by-function level based on authentications from the TPM. The operations may also include a software program, an application, a transaction, an execution of a smart contract, or an execution of a cryptocurrency exchange over one or more secure networks. In some implementations, the TPM can be configured to authenticate operations performed on the secure system, the operations including an execution of an enterprise key management (EKM) solution, signing a certificate as part of the EKM solution, or validating a certificate to be authentic as part of the EKM solution.

One or more embodiments described herein can include a system for securing a hardware security module (HSM) with a trusted platform module (TPM), the system including an HSM and a TPM in secure communication with the HSM. The TPM can be configured to provide authentication for the HSM based on a secret that can be shared between the TPM and the HSM, the TPM can be configured to establish the secret for authentication with the HSM based on logging into the HSM using a PIN number for the HSM and, through communication with the HSM, and generating a random number that is stored in secure memory of the TPM for authentication with the HSM in place of the PIN number.

In some implementations, the embodiments described herein can optionally include one or more of the following features. For example, the TPM can be configured to authenticate operations performed on the HSM. The HSM can be configured to perform the operations on a function-by-function level based on authentications from the TPM. The operations can include a software program or application. The operations can include a transaction. The operations can include an execution of a smart contract. The operations can include an execution of a cryptocurrency exchange over one or more networks, the one or more networks being at least a blockchain.

The devices, system, and techniques described herein may provide one or more of the following advantages. For example, the disclosed technology can secure HSMs and other types of systems by leveraging TPMs, thereby improving computer systems and technology. The disclosed technology can leverage state data, such as state data of a TPM during a TPM boot up process, contextual information, and other functions (e.g., hardware safeguards) of the TPM to a set of randomized data to make it difficult or otherwise impossible for other users to apply brute force or otherwise determine a PIN number used to secure an HSM and execute functions at the HSM. The TPM secures access to the HSM, which may require functions to be authenticated via the TPMs before execution. The TPM may add and extend cryptographic policies to different functions to be executed at the HSM so that for every function being called for execution, the TPM can generate a randomized number to replace the function's known PIN. As a result, the function can be securely executed in the TPM without concern that the randomized number may be compromised.

In another example, the disclosed technology can permit for one cryptographic device to be used to secure other cryptographic devices, such as using TPMs to secure HSM and/or other cryptographic devices. Cryptographic devices have often been considered secure based on the presence of cryptographic measures, but that understanding may not have appreciated the vectors and dimensions along which cryptographic measures provide security as well as their potential limitations (i.e., cryptographic measures may provide security for one feature, but not for others).

The disclosed technology can also provide increased security of blockchain assets or other network assets, such as cryptocurrencies, smart contracts, keys, other digital assets, and other types of blockchain-based information (e.g., non-fungible tokens (NFTs), digital records). After all, a central server system does not maintain control over parties' wallets, decisions, broadcasting to one or more blockchains, and/or asset itself. Rather, such control remains with the transacting parties. Moreover, the server system may not have access to, or otherwise come into possession or control of a crypto private key for a wallet, and therefore may be unable to retrieve the crypto private key. Instead, the crypto private key may be generated solely at an HSM solely at the direction of the authorized users. As described herein, the crypto private key can be generated at the TPM that is used to secure the HSM. The generation of the crypto private key can be conditioned upon confirmation through a server system-developed, automated policy engine, for which only a particular party (e.g., a party initiating a transaction) has the ability to define parameters for key generation. Such a multi-factor security system described herein may also provide that neither the transacting party nor the server system is independently able to complete a transaction of execution of operations.

The disclosed technology provides an agile MPC framework, infrastructure, and engine architecture to support various different networks, such as blockchains. As a result, the disclosed technology eliminates or otherwise mitigates a need for retail wallets or cumbersome hardware. Similarly, the disclosed technology can remain online and secure, even when new protocols or updates are made to the technology, since updates may simply be made to HSM crypto-libraries. Therefore, MPC algorithms and other techniques employed by the disclosed technology may not be required to be reconfigured from the ground up whenever a new blockchain is added and/or new assets are added. The architecture of the disclosed technology therefore results in short lead times, low engineering costs, and less or no time being offline or otherwise unavailable to parties.

As additional examples, the disclosed technology provides for HSMs secured via TPMs to retain secrets relating to a crypto wallet or other transaction, operation, or function, while a central server system can be used as a threshold authentication and/or authorization layer for transactions of assets over networks or execution of the transaction, operation, or function. The disclosed technology therefore can decouple crypto wallets and other transaction information from MPC signing curves. The disclosed technology can enable a higher degree of securability of MPC shards.

In another example, the disclosed technology can be used and extended to any of a variety of contexts to improve overall security and control related to key management and/or MPC transactions, such as blockchain transactions related to cryptocurrencies, digital records, and/or other blockchain assets. The disclosed technology can additionally be used outside of a blockchain context, and may be more broadly applicable to provision and management of MPC authentications and authorizations related to digital interactions that may require the consent of multiple parties for fulfillment. The disclosed technology may also be used to secure core infrastructure as an additional layer for supervisory control and data acquisition (SCADA) systems. The disclosed technology can be used to secure access to high security assets (e.g., buildings, vaults). The disclosed technology can be implemented as part of an approval business workflow that may require multiple parties to engage at multiple different levels of the business structure. In yet some implementations, the disclosed technology can be used to enable kill chains for various types of battle systems.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to technology for utilizing TPMs to secure access to systems, such as HSMs, in a network by acting as an authenticator to the systems and securing cryptographic logic in the systems. A user, such as a primary client device, can request to perform a function at a system, such as an HSM. Using the disclosed technology, an application can run in a TPM that is connected to the system. The application would be secured in a secure enclave of the TPM and only allowed to execute in that environment if the application passes TPM cryptographic requirements or otherwise authenticates access to the system. As a merely illustrative example, the TPM can receive a request to execute the application and can use a random number (e.g., 32 bit number) that was generated by the TPM to authenticate access to the system so that the application may then be executed at the system. Although the disclosed technology is described herein from the context of securing and authenticating HSMs, this is merely an illustrative and non-limiting example. The disclosed technology can be applied to secure and authenticate any other type of system, including but not limited to servers, computing systems, computing networks, data stores, and any other type of system that may require secure access.

The disclosed technology can be used in a variety of applications, including but not limited to key management, key storage solutions, and/or cryptocurrency transactions. Although some illustrative examples may be described throughout this disclosure regarding cryptocurrency transactions, the described operations can similarly apply to key management solutions. The illustrative examples described herein are not intended to be limiting examples of the disclosed technology.

Figure 1A:
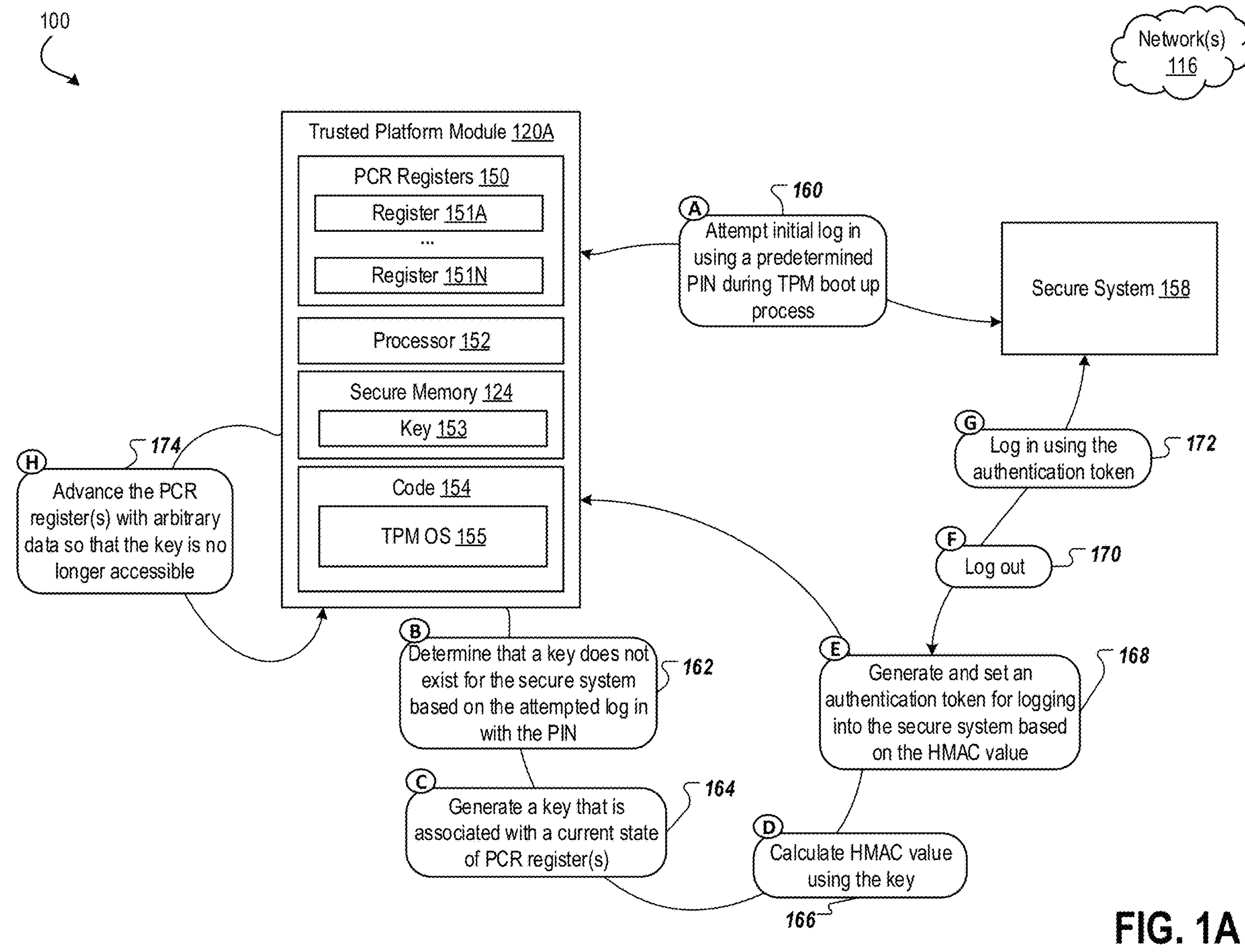
FIG. 1A is a conceptual diagram of a system for authenticating a secure system using a TPM.

Referring to the figures, FIG. 1A is a conceptual diagram of a system 100 for authenticating a secure system 158 using a TPM 120A. The TPM 120A can be configured to perform a process for authenticating the secure system 158 before a key has been initially generated for accessing the secure system 158. The process for authenticating the secure system 158 can be performed in response to the TPM 120A performing a boot up process, such as an initial boot up process. Values and other data available at the TPM 120A cannot be recreated by a user, thereby securing the authentication process for the secure system 158 in a zero trust environment and zero trust framework. Accordingly, no entity can access the secure system 158 without going through the authentication techniques described herein.

The TPM 120A can include Programmable Counter/Timer (PCR) registers 150 having one or more registers 151A-N, a processor 152, secure memory 124, and code 154, which can include a TPM operating system (OS) 155. The secure memory 124 can be configured to retain a key 153 for the secure system 158.

The PCR registers 150 can be configured to maintain information, values, hashes of values, and other data during a secure boot up process of the TPM 120A. As an illustrative example, certain data can be advanced to the PCR registers 150 during boot up, including hashes of values. The hashes can be derived from aspects and values associated with the TPM 120A that do not change. For example, the hashes of values may include hashes of the TPM 120A's BIOS, hashes of hardware components, hashes of software components, and/or hashes of firmware components.

The PCR registers 150 may operate similarly to blockchains when maintaining data associated with the secure boot up process. Sometimes, the PCR registers 150 can be used for implementing various timing-related functionalities in embedded systems, such as generating Pulse Width Modulation signals, measuring time intervals, controlling periodic tasks, and interfacing with external devices. For example, the PCR registers 150 can allow for configuring various parameters of the timer/counter, such as operating mode (timer or counter), clock source, prescaler settings, and interrupt enable/disable. The PCR registers 150 may also store current count values of a timer and/or counter. Sometimes, the PCR registers 150 may maintain comparison values, which can be used to compare against a current count value. In some implementations, when the count value matches this comparison value, certain actions can be triggered at the TPM 120A. Although the PCR registers 150 having the registers 151A-N are described herein, any other type of registers and/or similar systems within the TPM 120A where information (such as state information of the TPM 120A) are generated and accessible only by code in the TPM 120A can be used with the disclosed technology.

The processor 152 can be configured to execute instructions and/or the code 154 that are described throughout this disclosure. The secure memory 124 can be configured to store information and/or data at the TPM 120A, similar to other memory storage devices described further herein. For example, the memory 124 can be configured to maintain and store the key 153 for the particular secure system 158 (once the key 153 is generated at the TPM 120A) and/or keys for other secure systems that the TPM 120A is configured to authenticate. The code 154 can be executed by the process 152 of the TPM 120A to perform operations described herein. During a boot up process of the TPM 120A, for example, the processor 152 can be configured to execute code for the TPM OS 155.

In the system 100, the TPM 120A can communicate with the secure system 158 via network(s) 116. Refer to FIG. 1C for further discussion about the TPM 120A. The secure system 158 can be any type of computing system, server(s), network of computing systems or servers, and/or data store that may require secure access. As an illustrative example, the secure system 158 can include any one or more of the HSMs described herein.

As shown in FIG. 1A, the TPM 120A can attempt an initial log in of the secure system 158 using a predetermined PIN during a secure TPM boot up process (block A, 160). At an initial log in, the key 153 may not yet be created or in existence for the particular secure system 158. The predetermined PIN can be used to attempt the log in and when the log in fails, the TPM 120A can determine that the key 153 does not exist for the secure system 158.

Accordingly, the TPM 120A can determine that the key 153 does not exist for the secure system 158 based on the attempted log in with the PIN (block B, 162).

The TPM 120A can generate the key 153 that is associated with a current state of any one or more of the registers 151A-N of the PCR registers 150 (block C, 164). In a zero trust environment, the TPM 120A can generate the key 153 based off values stored in one or more of the registers 151A-N, those values indicating a current state of the TPM 120A during the boot up process. Since the key 153 can be tied to the current state of the TPM 120A as reflected in the values of the registers 151A-N, this technology provides one opportunity to log into the secure system 158 during the TPM boot up process. Advantageously, this configuration also provides additional security in the sense that a malicious actor would have to go through a significant number of reboots of the TPM 120A in order to try and get over the authentication process and into the HSM 104A. At that point, rules can be built into the TPM 120A to monitor for abnormal types and/or quantities of boots, which could signal activity of a malicious actor.

The values of the registers 151A-N can, in some implementations, indicate a current state of the TPM 120A at a time of the initial log in attempt. As another example, the values can indicate a current state of the TPM 120A at a time that the TPM 120A determines the key 153 needs to be created. Advantageously, the key 153 is dynamically generated at the current state of the TPM 120A to improve and enhance security. Although the values in the registers 151A-N may be PCR values as described above in reference to the PCR registers 150, the values in the registers 151A-N may include any other hardware, software, and/or hash values that may be generated by the TPM 120A and maintained/stored by the registers 151A-N. For example, the values in the registers 151A-N can include a hash of various different hardware, OS, and/or other software values that are generated at and/or during the boot up process for the TPM 120A. Various OS components and configuration information can be measured and stored as the values in the registers 151A-N of the PCR registers 150.

The TPM 120A can also calculate a Hash-based Message Authentication Code (HMAC) value using the key 153 (block D, 166). The HMAC value can also be tied to the current state of the registers 151A-N (such as the state when the key is requested to be created by the TPM 120A in block B, 162). The HMAC value is a cryptographic authentication code that can involve a cryptographic hash function and a secret key. For example, to calculate the HMAC value, the TPM 120A can apply a hash function to input, such as the PCR values, and the key 153 (e.g., secret key).

In block E (168), the TPM 120A can generate and set an authentication token for logging into the secure system based on the calculated HMAC value. The HMAC value can be attached to the authentication token (e.g., using a hash function) so that when the authentication token is used to log into the secure system 158, the secure system 158 can recalculate the HMAC value using the received authentication token (and the shared key 153, in some implementations). If the recalculated HMAC value matches the received HMAC value, then the log in is secure and authenticated, and the log in is successful. The authentication token can therefore be used to log into the secure system 158, not the PIN. The authentication token can include Secure Hash Algorithm (SHA) values, including but not limited to SHA-1, SHA-224, SHA-256, SHA-384, and/or SHA-512 values, each resulting in hash values of different lengths. The SHA values can be used to ensure data integrity, authenticity, and security, and can often be used to compute the HMAC value described herein.

Next, the TPM 120A can log out of the secure system 158 (block F, 170) so that the TPM 120A can log back into the secure system 158 using the authentication token (block G, 172), as described above. Therefore, the TPM 120A is not logging into the secure system 158 using the PIN, but rather by using the authentication token that was just generated.

The TPM 120A can also advance the PCR registers 150 with arbitrary data so that values from which the key 153 is derived are no longer accessible (block H, 174) (such that the key 153 value is only generated at boot). The PCR registers 150 value can also be automatically advanced after one or more actions described herein are performed, and/or the value of the key 153 may be wiped from memory automatically. This technique can advantageously protect the secure system 158 from both external (e.g., malicious actors) and internal (e.g., administrator) penetration or vulnerabilities. The advancing of the PCR registers 150 can be triggered in response to a successful log in of the secure system 158 using the authentication token. Advancing the PCR registers 150 ensures that malicious actors may not infiltrate and take the key 153 for accessing the secure system 158 at other times (such as during a next boot up process). In other words, the key 153 can only be used once to create the authentication token and the authentication token cannot be recreated during another time, such as during a next boot up process.

Figure 1B:
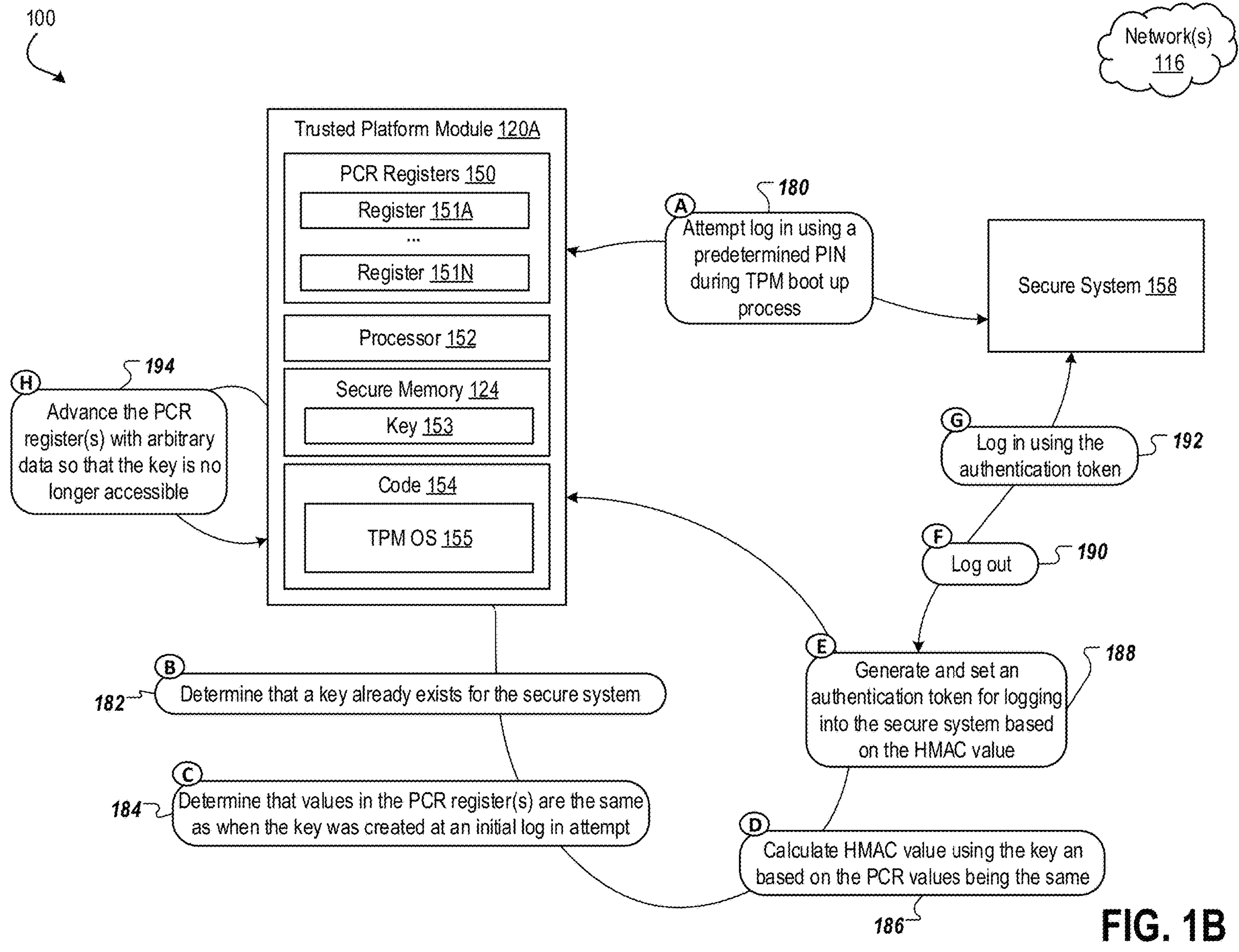
FIG. 1B is another conceptual diagram of a system for authenticating a secure system using a TPM.
Figure 1C:
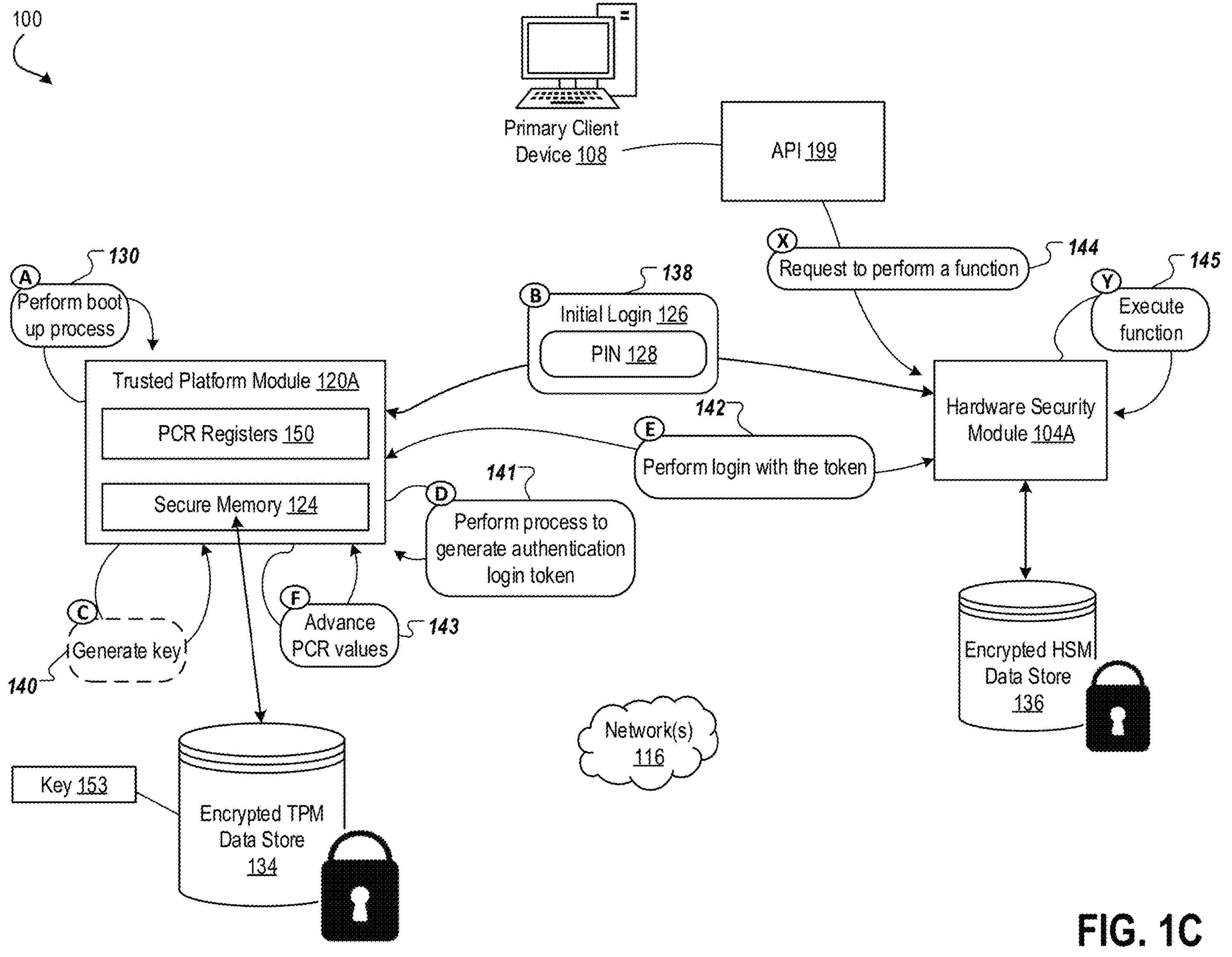
FIG. 1C is a conceptual diagram of a system for securing an HSM with a TPM.

FIG. 1B is another conceptual diagram of the system 100 for authenticating the secure system 158 using the TPM 120A. The techniques described in reference to FIG. 1B can be performed during next boot up process of the TPM 120A, or after an initial log in and key generation described in FIG. 1A.

Here, the TPM 120A can attempt a log in to the secure system 158 using a predetermined PIN during a boot up process for the TPM 120A (block A, 180).

The TPM 120A can determine that the key 153 already exists for the secure system 158 in block B (182) based on the attempt to log in to the secure system 158. Although the key 153 already exists, the login can fail. As a result, the TPM 120A cannot not simply log in to the secure system 158 using the PIN.

Rather, in block C (184), the TPM 120A can check the values in the PCR registers 150 and determine whether they are the same as when the key 153 was created at an initial log in attempt (refer to FIG. 1).

If the values are the same in the PCR registers 150, then the TPM 120A can proceed to block D (186), in which the TPM 120A can calculate an HMAC value using the key 153. If the values are different (e.g., any change occurred in the OS 155), then the TPM 120A can start a process to create a new key for the secure system 158, where the new key is associated with current state values of the registers 151A-N of the PCR registers 150. Refer to block D (166) in FIG. 1A for further discussion about calculating the HMAC value.

The TPM 120A can then generate and set an authentication token for logging into the secure system 158 based on the newly calculated HMAC value (block E, 188). Refer to block E (168) in FIG. 1A for further discussion.

The TPM 120A can log out of the secure system 158 in block F (190) so that the TPM 120A can successfully log into the secure system 158 using the new authentication token in block G (192). Refer to blocks F (170) and G (172) in FIG. 1A for further discussion.

Once successfully logged in to the secure system 158, the TPM 120A can advance one or more of the PCR registers 150 with arbitrary data so that values from which the values of the key 153 is no longer accessible (block H, 194). Refer to block H (174) in FIG. 1A for further discussion.

FIG. 1C is a conceptual diagram of the system 100 for securing an HSM 104A with the TPM 120A. FIG. 1C is an illustrative example of applying the techniques described in reference to FIGS. 1A and 1B to the HSM 104A (an example use case). In the system 100, a primary client device 108, the TPM 120A, the HSM 104A, an encrypted TPM data store 134, and an encrypted HSM data store 136 can communicate (e.g., wired, wirelessly) via network(s) 116. Refer to at least FIG. 3 for further discussion about the system 100 components.

The TPM 120A can perform a boot up process in block A (130). The TPM 120A can then communicate with the HSM 104A to perform an initial login 126 (block B, 138). During the initial login, a PIN 128 associated with the HSM 104A can be retrieved (e.g., from an encrypted TPM data store 134) and used by the TPM 120A to attempt a log in to the HSM 104A. Traditionally, to perform the function at the HSM 104A, the TPM 120A may use the PIN 128 associated with the HSM 104A to log into the HSM 104A and then execute the function in the environment of the HSM 104A. Using the disclosed technology, on the other hand, secure access and authentication can be performed by the TPM 120A.

Based on attempting to perform the initial login, the TPM 120A may optionally generate the key 153 for the HSM 104A (block C, 140). Refer to FIG. 1A for further discussion about generating the key 153. The key 153 can also be stored in the encrypted TPM data store 134 of the TPM 120A. The data store 134 can be accessed by the TPM 120A via secure memory 124. In some implementations, the key 153 may already be generated and thus the TPM 120A may not perform block C (140).

Once the key 153 is generated, the TPM 120A can perform a process to generate an authentication login token for the HSM 104A (block D, 141), as described further in reference to FIGS. 1A and 1B. The TPM 120A can then perform the login with the new authentication login token at the HSM 104A (block E, 142).

The primary client device 108 can also request to perform a function (any type of operation or action) in block X (144). The request can be transmitted to the HSM 104A via an API 199. The request can be generated and received at any time that blocks A-E (130-142) are being performed. Once the TPM 120A has performed a successful authentication of the HSM 104A and logged in using the new authentication token, the HSM 104A can execute the requested function in block Y (145). When performing the function at the HSM 104A, the HSM 104A can access and/or store associated information in an encrypted HSM data store 136.

The techniques and technology described in reference to FIGS. 1A, 1B, and IC can be performed in the background as a service, during the boot up process for the TPM 120A.

Figure 2:
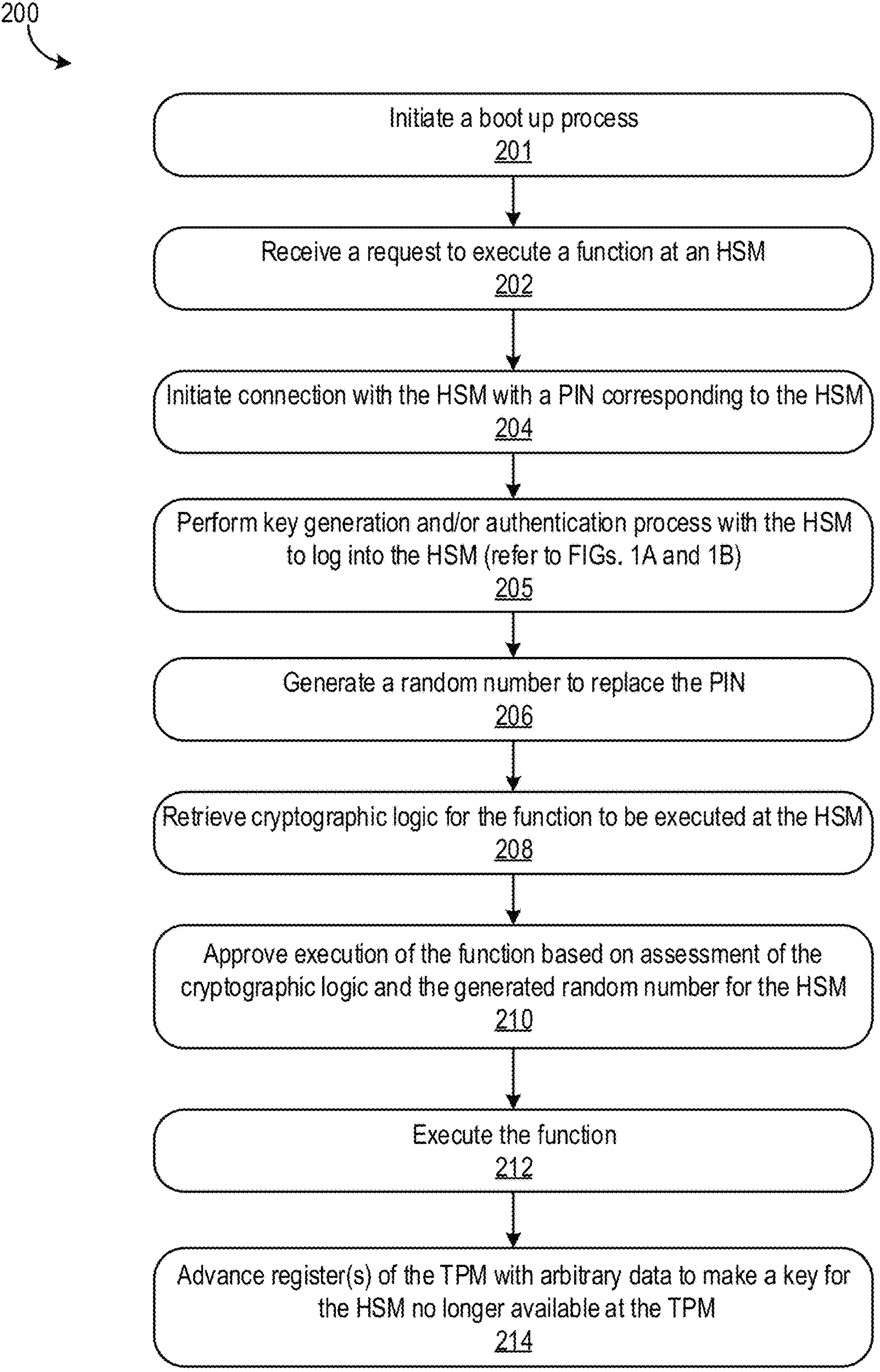
FIG. 2 is a flowchart of a process for securing an HSM with a TPM.

FIG. 2 is a flowchart of a process 200 for securing an HSM with a TPM. The process 200 can be performed by a TPM, such as the TPM 120A described herein. The process 200 can also be performed by one or more other computing devices and/or systems described herein. Although the process 200 is described from the perspective of authenticating access to the HSM, the process 200 can be performed to authenticate a process to be performed at any other system described herein, including but not limited to a server, a web server, a data store, and/or another secure computing system.

Referring to the process 200, the TPM can initiate a secure boot up process in block 201. Refer to FIGS. 1A, 1B, and IC for further discussion.

A request to execute a function at an HSM that the TPM is connected to can be received (block 202). The request can be received before or after one or more operations described herein in the process 200. Refer to block A (140) of FIG. 1C for further discussion.

In block 204, the TPM can initiate a connection with the HSM using a PIN corresponding to the HSM. Refer to at least block B (142) of FIG. 1C for further discussion.

The TPM may then perform a key generation and/or authentication process with the HSM to log into the HSM in block 205. Refer to at least FIGS. 1A and 1B for further discussion about the processes. For example, as described herein, the TPM can attempt logging into the HSM with a given token (the PIN). This log in can fail, which may trigger the TPM to perform the key generation process (refer to FIG. 1A). If the key already exists, the log in may still fail, which can trigger the TPM to perform the authentication process (refer to FIG. 1B). In block 205, the TPM can therefore generate a new key and/or a new authentication token, then use the new authentication token to successfully log into the HSM and perform the requested function.

The TPM can also generate a random number to replace the PIN in block 206. A first operation in running the function can be changing the PIN number to a randomly-generated 32-bit number. This operation can occur between the HSM and the TPM. The number can be hardware-randomized so that no human user would know the randomly generated number. The randomly generated number can then be used in all subsequent instances to run/execute the function when it is requested for execution. As soon as the random number is generated, the original PIN may no longer be valid. Moreover, because the random number is unknown to any human user, the random number may not be modified, thereby ensuring enhanced security of the HSM. In some implementations, if the PIN has already been used to access the HSM and execute the function, the TPM can skip block 206 and instead retrieve the corresponding randomly generated number (e.g., from the encrypted TPM data store 134).

The TPM can retrieve cryptographic logic for the function to be executed at the HSM in block 208. The logic can be stored locally at the TPM and/or in an encrypted data store that is accessible by the TPM and/or the HSM.

In block 210, the TPM can approve execution of the function based on assessment of the cryptographic logic and the generated random number for the HSM. Because the TPM has successfully logged into the HSM in block 205 and thus authentication to execute the function has passed, the function can be passed into the HSM for execution.

Once the execution has been approved (e.g., authentication has been performed by the TPM as described herein), the function can be executed at the HSM (block 212).

The TPM may also advance one or more registers of the TPM with arbitrary data to make values for deriving a key for the HSM no longer available for the authentication process in block 205 (block 214). As a result, the key may only be generated once during the boot up process, thereby preventing a potentially malicious actor from attempting to hack into the HSM. The TPM can include additional safeguards, such as rules, that can be executed to count a number of times that the boot up process is attempted and equate the count to potentially malicious activity. For example, the malicious actor may attempt to hack into the HSM by rebooting the TPM more than a predetermined amount of times. The continuous reboots can trigger a rule indicating that the malicious actor is attempting to break into the HSM.

Figure 3:
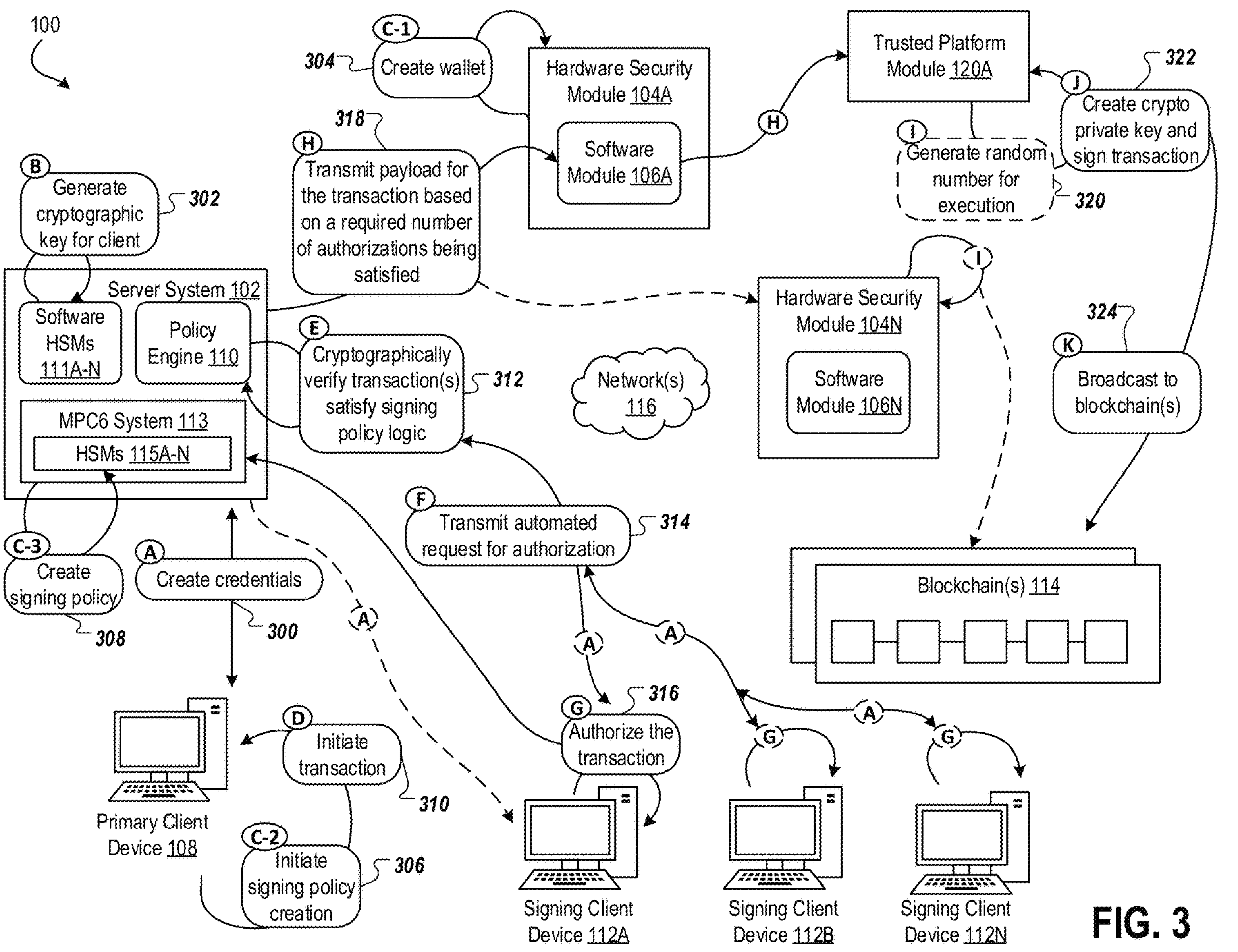
FIG. 3 is a conceptual diagram of a system for providing non-custodial crypto asset management using MPC techniques for parties to securely perform transactions over various networks.

FIG. 3 is a conceptual diagram of the system 100 for providing non-custodial crypto asset management using MPC techniques for parties to securely perform transactions over various networks. The system 100 can be used to perform cryptocurrency transactions over various ledgers, including but not limited to blockchains. The system 100 can be used to perform various other types of transactions, including but not limited to smart contract execution, other legal contract execution, etc. As described herein, the system 100 can also be used for key management (e.g., EKM) solutions. Although the system 100 is described in the perspective of cryptocurrency transactions, the system 100 and its techniques are applicable in a variety of use cases and applications, including but not limited to healthcare, banking, contracting, key management, legal industry, etc.

Figure 5:
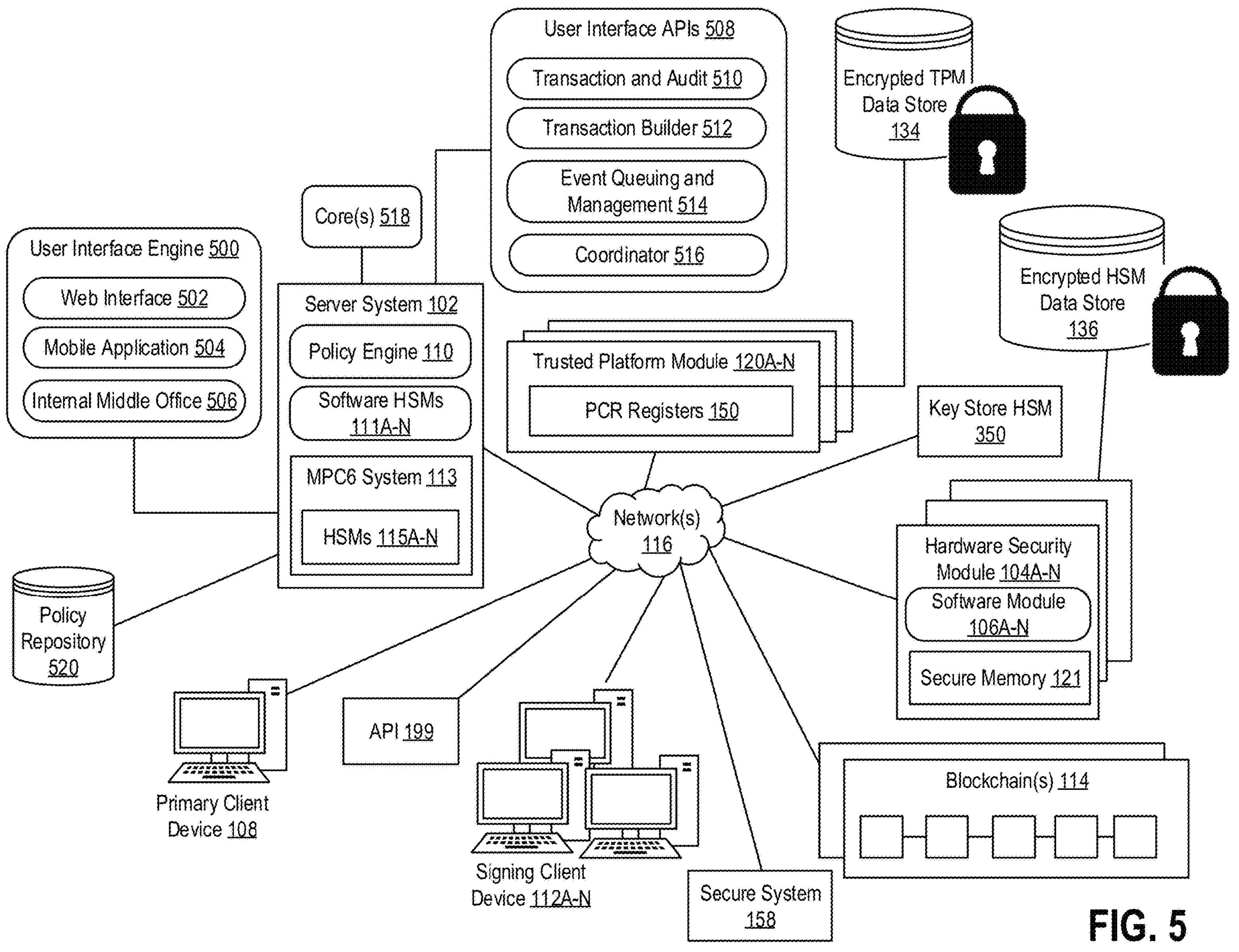
FIG. 5 is a system diagram of components that can perform the disclosed techniques.

In the system 100, a server system 102, hardware security modules (HSMs) 104A-N, primary client device 108, signing client devices 112A-N, blockchain(s) 114, and TPM 120A can communicate with each other (e.g., wired, wirelessly) via network(s) 116. The server system 102 can be any type of computing system, network of computing devices/systems, cloud-based computing system, secure enclave, etc. that can be configured to provide software to components such as the HSMs 104A-N, the primary client device 108, and the signing client devices 112A-N. The server system 102 can be used to generate and compute MPC-based authentication and authorization requests, which may be presented at a later time to the HSMs 104A-N as proof of authorization for signing and broadcasting to the relevant blockchain(s) 114. Refer to FIG. 5 for further discussion about software and other components that are provided by the server system 102.

The server system 102, for example, can include a policy engine 110, software HSMs 111A-N, and an MPC6 system 113. The MPC6 system 113 can further include one or more HSMs 115A-N. In some implementations, the policy engine 110 can be a software module deployed in one or more other computing environments, including but not limited to an enclave or one or more of the components described herein. The policy engine 110 can be configured to perform one or more of the disclosed techniques, such as ensuring that transactions requested by the primary client device 108 satisfy signing policies and parameters that are defined by the primary client device 108. The policy engine 110 can designate and administer differing conditions and levels of confirmation from one or more of the signing client devices 112A-N for various transactions associated with a wallet (such as a public wallet associated with the primary client device 108). The policy engine 110 can communicate and interact with other components in the system 100, such as a software module 106A-N at each of the HSMs 104A-N, the blockchain(s) 114, other components of the server system 102, and other client devices to authorize transactions on public wallets.

In brief, the HSMs 104A-N can each be a physical computing device that safeguards and manages secrets, such as digital keys, performs encryption and decryption functions for digital signatures, and provides authentication and/or other cryptographic functions. HSMs 104A-N can be plug-in cards and/or external devices that attach to computing systems, computing devices, and/or network servers. In some implementations, one or more of the HSMs 104A-N can be operated by and/or configured to the server system 102. One or more of the HSMs 104A-N can be remote from the server system 102 and configured to one or more computing systems, computing devices, network servers, and/or networks of computing devices associated with third parties. For example, a third party can host one or more of the HSMs 104A-N, which then communicate with components in the system 100 such as the server system 102.

Each of the HSMs 104A-N can include respective software modules 106A-N (e.g., multiple different instances of the software module across different HSMs 104A-N), which can be generated and provided to the HSMs 104A-N by the server system 102. The software module 106A-N can provide instructions for the HSMs 104A-N to create crypto private keys and sign transactions that are requested by the primary client device 108, authorized by a required threshold number of the signing client devices 112A-N, and then verified by the policy engine 110 of the server system 102 for satisfying requirements of the signing policy of the primary client device 108.

Each of the HSMs 104A-N can be tied or otherwise connected (e.g., wired, wireless) to a corresponding TPM 120A (e.g., TPMs 120A-N). Sometimes, each of the HSMs 104A-N can be connected to multiple TPMs. The TPMs 120 can be configured to secure the HSMs 104A-N such that transactions, operations, and/or functions that are transmitted to the HSMs 104A-N for execution can instead be cryptographically checked and executed at the corresponding TPMs. Refer to FIGS. 1-2 for further discussion about the TPMs 120.

The primary client device 108 and signing client devices 112A-N can be any types of user computing devices, including but not limited to laptops, tablets, computers, mobile phones, smart phones, wearable devices, cloud-based computing systems, and/or networks of computing systems/servers. The primary client device 108 and the signing client devices 112A-N can provide the software platform generated by the server system 102 to their relevant users/parties.

The primary client device 108 can be operated by a party (e.g., user) that creates a wallet (e.g., public wallet) and uses the software platform generated and provided by the server system 102 to perform transactions in the system 100 (e.g., cryptocurrency transactions). The party also can establish signing policies with defined parameters (e.g., a minimum required number of signing client devices that must authorize a transaction before the transaction is verified, signed, then broadcasted) that are then used by the policy engine 110 to verify transactions that are requested by the primary client device 108.

The signing client devices 112A-N can be operated by other parties (e.g., users) that are selected to be part of one or more signing groups according to the signing policies and parameters defined by the primary client device 108. The signing client devices 112A-N can also run the software platform provided by the server system 102 to allow the associated parties to authorize (or not authorize) transaction requests that are made by the primary client device 108 or other client devices that request transactions across networks such as the blockchain(s) 114.

The blockchain(s) 114 can be any type of system and/or ledger that records transactions, such as cryptocurrency transactions. The blockchain(s) 114 can allow digital information to be recorded and distributed, but not edited/modified. Thus, the blockchain(s) 114 can be an immutable ledger, or record of transactions that cannot be altered, deleted, or destroyed. The blockchain(s) 114 can be maintained across multiple computing systems that may be linked over one or more networks. The blockchain(s) 114 can include public blockchains (e.g., permissionless distributed ledger on which anyone can join and conduct transactions), private blockchains (e.g., a blockchain network that may operate in a private context, such as a restricted network, or is controlled by a single entity), hybrid blockchains, etc.

Still referring to the system 100 in FIG. 3, the primary client device 108 and the server system 102 can communicate to create user credentials (as non-limiting examples, these can include username, password, etc.) in block A (300). The server system 102 can also optionally communicate with one or more of the signing client devices 112A-N to create user credentials for parties associated with the devices 112A-N. For example in block A (300), the server system 102 can communicate with the signing client devices 112A-N that do not yet have user credentials established but have been identified as part of a signing group for a signing policy of the primary client device 108. The server system 102 can communicate with the client devices 112A-N before or after one or more other blocks described herein (e.g., after the primary client device 108 creates a signing policy in block C-3, 308, as part of transmitting an automated request for transaction authorization in block F, 314, before verifying that a transaction satisfies the signing policy in block E, 312, etc.).

One or more of the software HSMs 111A-N of the server system 102 can generate a cryptographic key for the primary client based on the user credentials in block B (302). The process to generate the key can be initiated at the primary client device 108 and executed by the one or more software HSMs 111A-N. In general, generating the cryptographic key can include operations such as authenticating the primary client with the HSMs 111A-N using their credentials, verifying the identity of the primary client by the HSMs 111A-N, the HSMs 111A-N checking their authorization level to determine what actions the primary client is allowed to perform, and the HSMs 111A-N generating random numbers to create the key. The HSMs 111A-N can then create the key using a cryptographic algorithm (which may be determined by the primary client's requirements and/or security policies configured on the HSMs 111A-N).

In block C-1 (304), the HSM 104A can create a wallet for the primary client device 108, based at least in part on the user credentials and public key infrastructure (PKI) certificates. In some implementations, the TPM 120A can be configured to create the wallet, using the disclosed techniques.

In block C-2 (306), the primary client device 108 can initiate creation of a signing policy. Instructions to create/generate the signing policy can be transmitted to the server system 102 (e.g., in plain text format). Accordingly, the HSMs 115A-N of the MPC6 system 113 at the server system 102 can create the signing policy according to parameters defined by the primary client device 108 in block C-2, 306 (block C-3, 308). The signing policy can be created at the server system 102 with multiple different transaction values and/or business logic. Creating the signing policy can, for example, include generating cryptographic logic to then be executed by the policy engine 110 during runtime use.

The primary client device 108 can initiate a transaction request in block D (310), as described herein.

The transaction request can be sent to the policy engine 110, which can cryptographically verify that the transaction request satisfies the signing policy cryptographic logic (block E, 312). The policy engine 110 can also determine, based on transaction details in the transaction request, how many signing client devices are required.

The policy engine 110 can transmit an automated request for transaction authorization to the determined number of the signing client devices 112A-N needed for authorizing the particular transaction request (block F, 314). In some implementations, the request can be sent to a threshold quantity of the signing client devices 112A-N that is greater than a required number of signing client devices 112A-N to authorize the transaction. The request can be sent to just the required number of signing client devices 112A-N to authorize the transaction, as mentioned above. Moreover, in some implementations, the server system 102 can receive the authorization requests and broadcast those requests to the signing client devices 112A-N.

One or more of the signing client devices 112A-N can authorize the transaction request (block G, 316). Authorization results can be transmitted from the signing client devices 112A-N to the MPC6 system 113. The MPC6 system 113 may communicate the authorization results to the policy engine 110.

If the policy engine 110 determines that the required number of signing client devices 112A-N (as defined by the signing policy or other parameters defined by the primary client device 108) authorize the transaction in G (316), the policy engine 110 can transmit a payload for the transaction to the one or more HSMs 115A-N to perform an MPC signing operation to then generate the authorization payload that will be presented/transmitted to the software module 106A-N of one or more of the HSMs 104A-N and/or the TPM 120A that is tied to or otherwise connected to the one or more of the HSMs 104A-N (block H, 318). As described further below, the TPM 120A can receive the authorization payload from the HSMs 115A-N, then sign and broadcast the transaction to the blockchain(s) 114.

Optionally, the TPM 120A can generate a random number for executing the transaction in block I (320). As described in reference to FIGS. 1-2, the random number can be generated a first time that the primary client device 108 initiates the particular transaction in block D (310). The generated random number can then be used instead of a PIN number associated with the HSM 104A to create a crypto private key for the primary client device 108 and sign the transaction based on information provided in the payload (block J, 322). For example, the TPM 120A can receive, on behalf of the HSM 104A, the cryptographic logic that is generated as part of creating the signing policy and use the logic to validate the authorization results from the signing client devices 112A-N and sign the transaction with the generated random number.

The signed transaction is then broadcasted to the blockchain(s) 114 (block K, 324). The broadcasting can be performed by a third-party node that is designated/chosen by the primary client device 108. As an illustrative example, the server system 102 can provide the primary client device 108 with a selection of third-party nodes from which the primary client device 108 can choose for broadcasting the signed transaction. In some implementations, the primary client device 108 can download the signed transaction and then broadcast the transaction on their own to the blockchain(s) 114. The broadcasting can be performed directly or indirectly by the HSM 104A and/or the TPM 120A securing the HSM 104A.

As described throughout this disclosure, a cryptocurrency wallet operating on the TPM 120A on behalf of the HSM 104A may not be a multi-signature wallet since only a single crypto private key is used by the TPM 120A to sign transactions and that private key is not shared or otherwise distributed. The private key can be split up and secured by additional secrets that are associated with user accounts (e.g., the multiple signing client devices 112A-N). However, the concept of multiple signing client devices 112A-N confirming or authorizing before a proposed transaction can proceed, none of which may be controlled by the server system 102 itself, can be functionally similar with un-hosted multi-signature wallets, but with cryptographic security instead. Although the signing client devices 112A-N must validate each transaction request using their own credentials (e.g., username and password) and organizational x509 certificate, those signatures effectively can act as passcodes that are then used collectively to enable the crypto private key to be computed and then used to sign transactions at the TPM 120A. Accordingly, while the use of a sufficient number of signing client devices 112A-N credentials are a necessary condition to the TPM 120A signing a transaction request on behalf of the HSM 104A, the signing client devices 112A-N are not themselves signing the transaction request using a wallet private key. Rather, the signing client devices 112A-N can provide their approval of the transaction request through cryptographic key technology that confirms they are indeed the signing client devices 112A-N with the authority to provide approval of the transaction request.

Although FIG. 3 is described from the perspective of signing transactions with crypto assets on the blockchain(s) 114, the disclosed techniques can also be performed to execute various types of functions, operations, software processes, etc. that may be requested for execution in HSMs 104A-N, such as any key management operations that can be performed using keys in the HSMs 104A-N.

Figure 4:
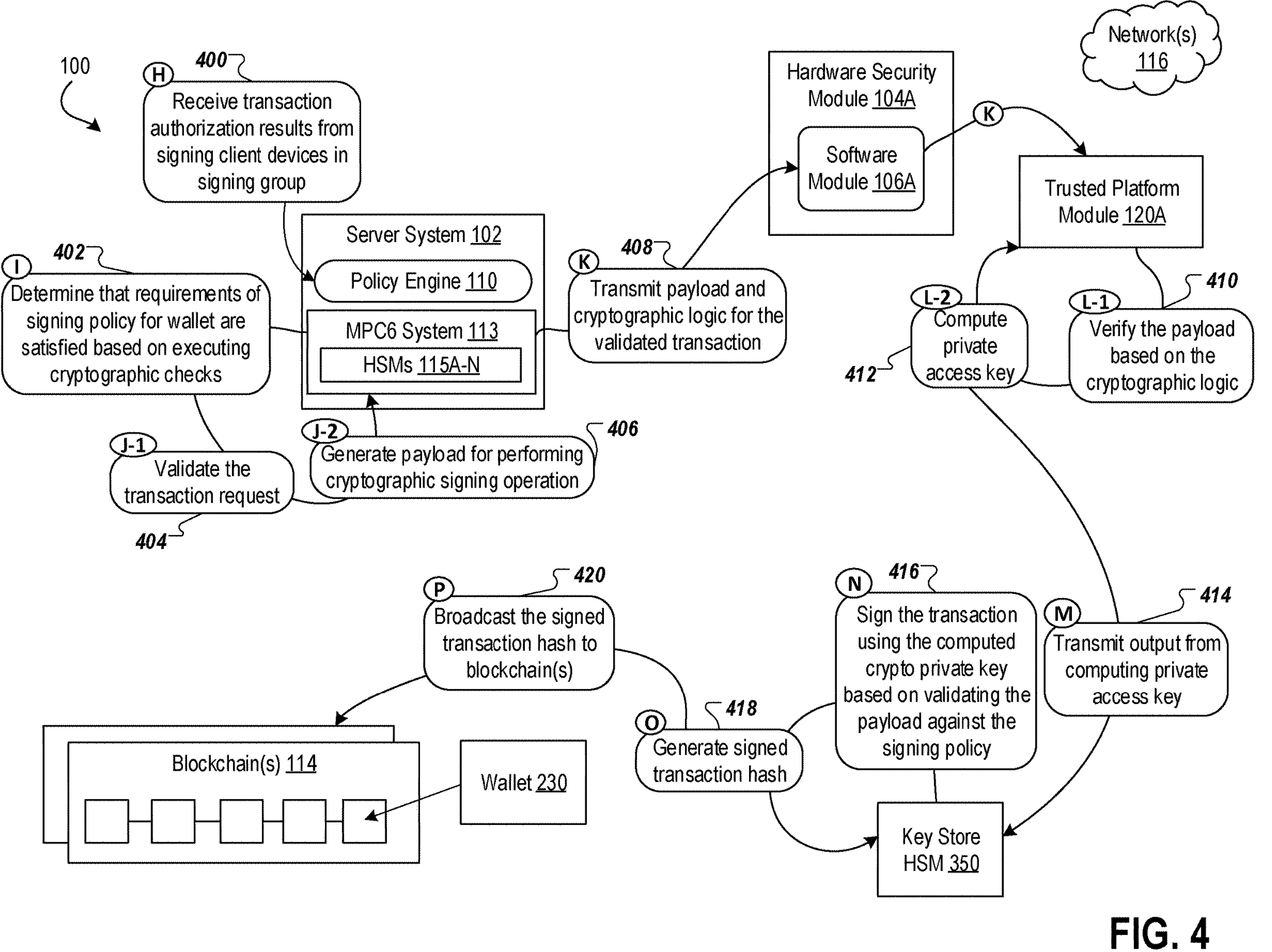
FIG. 4 is a conceptual diagram of a system for broadcasting approved transactions to one or more blockchains or other networks.

FIG. 4 is a conceptual diagram of the system 100 for broadcasting approved transactions to one or more blockchains or other secure networks.

The server system 102 can receive transaction authorization results from signing client devices in a signing group in block H (400). Such results can include information including but not limited to whether the transaction was authorized and approved by the respective signing client device, whether the transaction was not authorized, whether there was an error during the authorization process, whether the transaction requires additional verification steps before it can be authorized, whether the authorization process took too long and timed out, and/or whether the transaction was cancelled before it could be authorized. The authorization results may vary based on specific implementations and requirements of the signing client devices and/or overall authorization process.

The MPC6 system 113 can determine that requirements of the signing policy for a wallet 230 associated with the primary client device 108 are satisfied based on executing one or more cryptographic checks (block I, 402). The MPC6 system 113, and more particularly the one or more HSMs 115A-N of the MPC6 system 113, can assemble a cryptographic signing function with snippets or secret material of authorization that comes from the signing client devices described herein. The MPC6 system 113 can also perform various levels of cryptographic checks, including but not limited to checking policy engine certificates, checking individual signing client device certificates to confirm those signing client devices are in fact are allowed to authorize such a transaction, checking that a server cryptography is correct, and checking that no random servers have accessed the network(s) 116 or any of the components described herein (e.g., the server system 102, the HSM 104A, the primary client device 108, the signing client devices 112A-N).

Accordingly, the MPC6 system 113 can validate the transaction request based on the determination in block I, 402 (block J-1, 404). In other words, the transaction request can be validated if the MPC6 system 113 determines that the requirements of the signing policy for the wallet 230 associated with the primary client device 108 are satisfied.

In block J-2 (406), the MPC6 system 113 can generate a payload for performing a cryptographic signing operation. Based on the cryptographic certificate, the certificates (e.g., signing authorizations) from the policy engine 110, and output from the determination in block I (402) to assemble the cryptographic signing function, the MPC6 system 113 can generate the payload.

The MPC6 system 113 can transmit the payload and cryptographic logic for the validated transaction to the software module 106A of the HSM 104A (block K, 408). The payload can include transaction information and confirmation that the cryptographic checks performed by the MPC6 system 113 have passed. As described herein, when the HSM 104A is connected to the TPM 120A, the payload and cryptographic logic can be transmitted directly to the TPM 120A for checking and execution.

In block L-1 (410), the TPM 120A can verify the payload based on the cryptographic logic. The TPM 120A can check the payload against the certificates from the policy engine 110 using the cryptographic logic in order to ensure that the transaction has in fact been authorized. In some implementations, the TPM 120A can also verify the payload based on validating identities of the signing client devices 112A-N with the cryptographic logic to ensure that the signing client devices 112A-N have actually been identified in the associated signing policy to have the authorization responsibility.

Once the payload is verified, the TPM 120A can compute the crypto private access key for the wallet associated with the transaction (e.g., the wallet associated with the primary client device 108) using the secret material related to the wallet that is maintained/stored on behalf of the HSM 104A. In other words, the TPM 120A creates an actual signed cryptocurrency transaction based on the information contained in the payload and other information that may be resident at the TPM 120A from the cryptocurrency wallet creation (e.g., the secret materials described herein). A security feature of a wallet is that the associated crypto private key is not stored at rest in the TPM 120A or the connected HSM 104A. Instead, the crypto private key may only be derived within the TPM 120A if certain conditions are met, such as the transaction having been cryptographically confirmed by the policy engine 110 as described above. Upon receipt of the transaction information payload and confirmation by the TPM 120A that all required cryptographic checks have been provided, the TPM 120A computes the crypto private key (block L-2, 412).

The TPM 120A can transmit output from computing the private access key to a key store HSM 350 (block M, 414). The key store HSM 350 can be separate from the HSM 104A and the TPM 120A, but can be in network communication (e.g., wired, wireless). In some implementations, the key store HSM 350 can be part of the server system 102, part of the MPC6 system 113, and/or one of the HSMs 115A-N that resides within the MPC6 system 113.

The key store HSM 350 can be configured to sign the transaction using the computed crypto private access key (block N, 416). The signing can be performed based on validating the payload against the signing policy (e.g., using the cryptographic logic provided by the policy engine 110 of the server system 102).

The key store HSM 350 can also generate a signed transaction hash in block O (418). For example, the HSM 350 can apply a cryptographic hash function (such as SHA-256) to the transaction data to generate a fixed-length string of characters uniquely representing the input data. Change in the input data can result in a different hash value being generated.

Then, the signed transaction hash can be broadcasted to the blockchain(s) 114 (or other networks) (block P, 420). The wallet 230, having a unique address, can be broadcasted to the blockchain(s) 114, to which tokens, cryptocurrencies, or other assets may be assigned. Once signed, the signed transaction hash, still resident within the TPM 120A on behalf of the HSM 104A, will be ready to be broadcast to the blockchain(s) 114. The server system 102 described herein can allow the primary client device 108 to determine how to broadcast the transaction to the blockchain(s) 114 network. In some implementations, as described above, the server system 102 can provide the primary client device 108 with options to communicate the transaction to a blockchain miner or other third-party node that may be unaffiliated with the server system 102. As a result, (i) fees that may be charged by the blockchain miner to broadcast the transaction can be paid by the primary client device 108 directly, rather than the server system 102, (ii) the server system 102 may not receive any portion of these fees or other compensation from the blockchain miner, and/or (iii) the primary client device 108 may not be required to use any such miner and may broadcast the transaction independently from its relationship with the server system 102. In any case, the server system 102 may not be directly involved in broadcasting the transaction to the blockchain(s) 114.

Accordingly, once the transaction is signed, it is the primary client device 108, not the server system 102, the HSM 104A, the TPM 120A, or the key store HSM 350, that is responsible for causing the transaction to be broadcast to the blockchain(s) 114 network. Moreover, the server system 102 does not have total independent control of value held in a wallet. Cryptocurrency can be held in the cryptocurrency wallet, the private key for which may not be held by the server system 102 and instead may only be generated within the TPM 120A on behalf of the HSM 104A. Although the wallet itself does not use multiple private keys to sign transactions within the TPM 120A, security features provided by the server system 102 can be functionally equivalent to a multi-signature wallet from a control sense, in that in order for a wallet owner to effect a transaction (e.g., the primary client device 108), multiple validated authorizations (e.g., by the signing client devices 112A-N) may be required as an input for the creation of the transaction message that is transmitted to the blockchain(s) 114. As in a multi-signature wallet, no single party, including the server system 102, has the ability to transact in the cryptocurrency held by a wallet. The cryptocurrency remains owned by the party of the primary client device 108 and can be held in the wallet rather than being reflected in accounts of the server system 102. Only the party of the primary client device 108 can trigger interaction with the wallet by initiating a transaction through the web portal and confirming the transaction through the signing client devices 112A-N. Once the policy engine 110 validates the cryptographic checks and the TPM 120A signs the transaction, the party of the primary client device 108, not the server system 102, can control how the signed transaction is communicated to the blockchain(s) 114, or a payment system. Therefore, the server system 102 may not have independent control of the value, because the private key for the wallet may only be generated within the TPM 120A on behalf of the HSM 104A, which is not controlled by the server system 102.

FIG. 5 is a system diagram of components that can perform the disclosed techniques. As described herein, the server system 102, HSMs 104A-N, TPMs 120A-N, primary client device 108, signing client devices 112A-N, blockchain(s) 114, policy repository 420, key store HSM 350, encrypted TPM data store 134, encrypted HSM data store 136, API 199, and secure system 158 can communicate via the network(s) 116. As described herein, a party at the primary client device 108 can transact with another party over the blockchain(s) 114 using the disclosed technology. The disclosed system components can be provided as software as a service. Refer to FIGS. 1A and 1B for further discussion about the components of the TPM 120A-N, the API 199, and the secure system 158.

The server system 102 can include various software components, including but not limited to the policy engine 110 described herein, software HSMs 111A-N described herein, the MPC6 system 113 having the HSMs 115A-N (e.g., hardware components), a user interface engine 500, user interface APIs 508, and core(s) 518. In some implementations, the policy engine 110 can be one of the user interface APIs 508. The server system 102 can also generate and provide the software modules 106A-N to the HSMs 104A-N and/or to the TPMs 120A-N that are connected to the HSMs 104A-N according to the disclosed techniques. The server system 102 can also provide an asynchronous MPC messaging network. Since the server system 102 can be separate from the HSMs 104A-N and the TPMs 120A-N, the server system 102 components (e.g., software) can be deployed across a number of different industries and use cases, including but not limited to defense, healthcare, traditional banking, and/or building access controls.

The user interface engine 500 can include a web interface 502, mobile application 504, and/or internal middle office 506. The user interface engine 500 can be configured to implement logic for parties at the primary client device 108, the signing client devices 112A-N, or other client devices to manage their accounts and generate and perform transactions. The user interface engine 500 components can be provided as software as a service and/or with private cloud management.

The user interface APIs 508 can include a transaction and audit API 510, transaction builder 512, event queuing and management API 514, and/or a coordinator 516. The APIs 508 can be configured to implement and/or provide logic for techniques such as transaction assembly, signing policy evaluation, and transaction signing. The user interface APIs 508 can be provided as software as a service. Sometimes, the APIs 508 can be provided as software enclaves that can be partly hosted within a client device/computing system estate. The APIs 508 can be used as a threshold authentication and/or authorization platform irrespective of a domain application. The APIs 508 can additionally and/or alternatively be used to provide one or more of the following functions to parties at the primary client device 108 and the signing client devices 112A-N: creating user accounts, creating signing groups, setting threshold numbers of signing client devices, adding signing client devices to signing groups, removing signing client devices from the signing groups, setting message payloads, returning message payloads, setting and returning event model loops, and other functions.

The HSMs 104A-N software module 104 can be offered as software as a service across various different computing devices, systems, and/or networks in multiple different geographies. The HSMs 104A-N, via the software modules 106A-N, can be configured to store wallet information, in some implementations. In some implementations, one or more of the HSMs 104A-N may be partly hosted within the client device/computing system estate. The HSMs 104A-N can also include secure memory 121 for maintaining information in a secure way.

As described in reference to at least FIGS. 1-2, the HSMs 104A-N can further be connected to respective trusted platform modules 120A-N, each of which have respective secure memory 124. Each of the trusted platform modules 120A-N can further be linked or otherwise in connection with the respective encrypted TPM data store 134. Likewise, each of the HSMs 104A-N can be connected to the respective encrypted HSM data store 136.

Figure 6:
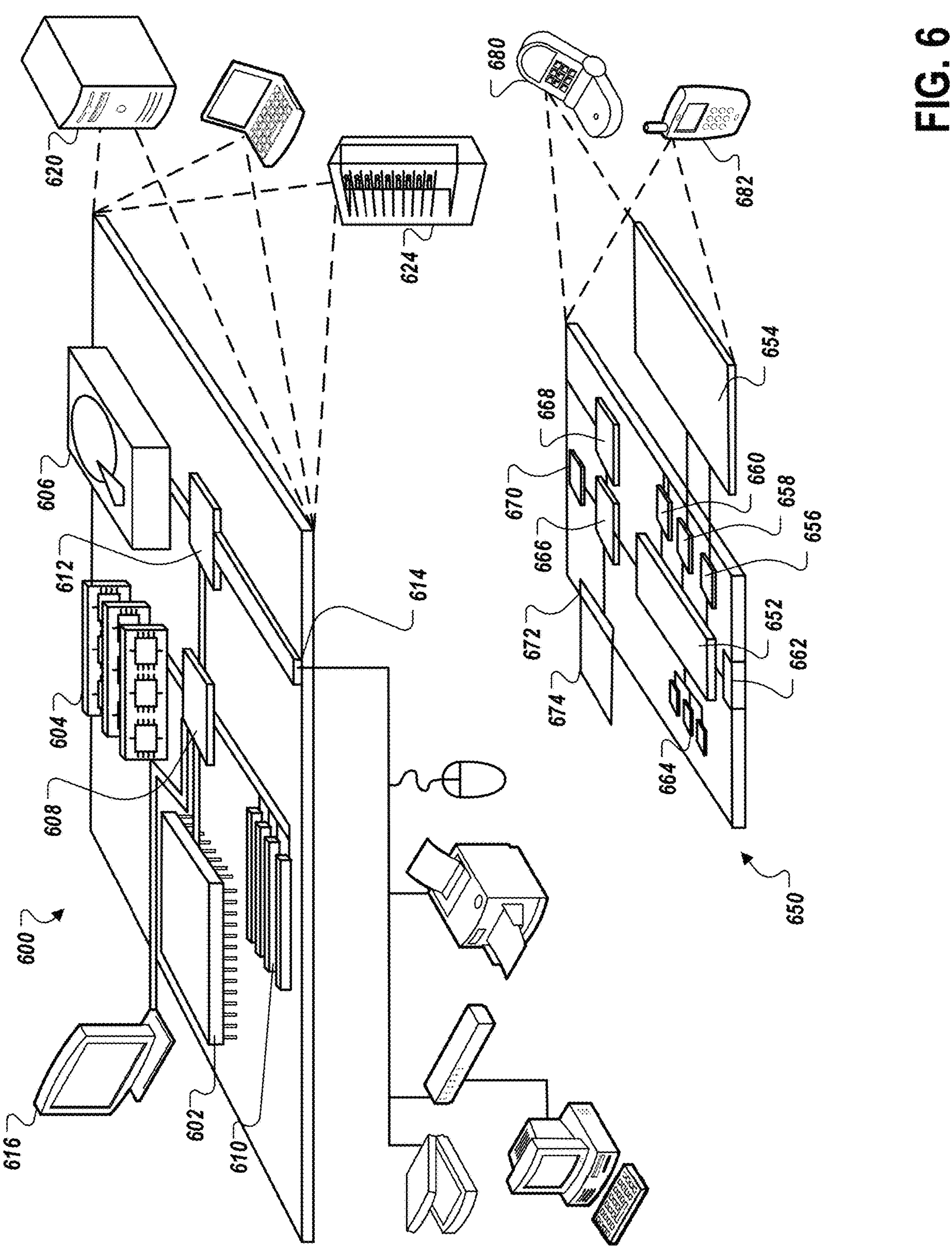
FIG. 6 is a schematic diagram that shows an example of a computing device and a mobile computing device.

FIG. 6 shows an example of a computing device 600 and an example of a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. In addition, it can be implemented in a personal computer such as a laptop computer 622. It can also be implemented as part of a rack server system 624. Alternatively, components from the computing device 600 can be combined with other components in a mobile device (not shown), such as a mobile computing device 650. Each of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, and a transceiver 668, among other components. The mobile computing device 650 can also be provided with a storage device, such as a micro-drive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can provide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which can include, for example, a SIMM (Single In Line Memory Module) card interface. The expansion memory 674 can provide extra storage space for the mobile computing device 650, or can also store applications or other information for the mobile computing device 650. Specifically, the expansion memory 674 can include instructions to carry out or supplement the processes described above, and can include secure information also. Thus, for example, the expansion memory 674 can be provide as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, can include recorded sound (e.g., voice messages, music files, etc.) and can also include sound generated by applications operating on the mobile computing device 650.

The mobile computing device 650 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

What is claimed is:

1. A trusted platform module (TPM) for authenticating a secure system, the TPM comprising:
- one or more registers configured to automatically generate and maintain hash values indicating current state values of the TPM;
- secure memory configured to store a key in association with a secure system; and
- a processor in network communication with the one or more registers and the secure memory, wherein, during a secure boot up process, the processor is configured to perform operations comprising:
  - receiving a request to log into the secure system;
  - deriving, based on the request, the key for the secure system from the hash values that are automatically generated by the one or more registers;
  - calculating a Hash-based Message Authentication Code (HMAC) value using the key;
  - generating, based on the HMAC value, an authentication login token for the secure system;
  - updating the hash values that are maintained by the one or more registers from their initial state during the secure boot up process;
  - logging out of the secure system in response to generating the authentication login token; and
  - logging back into the secure system using the authentication login token.

2. The TPM of claim 1, wherein the operations further comprise:
- attempting an initial login of the secure system using a PIN value associated with the secure system;
- determining, based on the attempted initial login, whether a key exists in association with the secure system; and
- deriving an access key from the hash values based on a determination that the key does not exist in storage in the secure memory.

3. The TPM of claim 1, wherein the current state values comprise configuration and component information of the TPM that was recorded in the one or more registers at a time that the secure boot up process occurred.

4. The TPM of claim 1, wherein the secure system comprises a hardware security module (HSM).

5. The TPM of claim 1, wherein the operations further comprise:
- receiving, from a client device via an API, user input to perform a function at the secure system; and
- transmitting instructions to execute the function at the secure system in response to authenticating the secure system using the authentication login token.

6. A system for authenticating a secure system with a TPM, the system comprising:
- a secure system; and
- a TPM in secure communication with the secure system, the TPM comprising one or more registers and secure memory, wherein, during a secure boot up process, the TPM is configured to perform operations comprising:
  - attempting an initial login of the secure system using a PIN value associated with the secure system;
  - determining, based on the attempted initial login, whether a key exists in association with the secure system;
  - generating, based on a determination that the key does not exist, a key that is associated with current state values of the TPM that are maintained by the one or more registers;
  - calculating a HMAC value using the key;
  - generating, based on the HMAC value, an authentication login token for the secure system;
  - logging out of the secure system in response to generating the authentication login token; and
  - logging back into the secure system using the authentication login token.

7. The system of claim 6, wherein the current state values comprise configuration and component information of the TPM that was recorded in the one or more registers at a time that the determination was made.

8. The system of claim 6, wherein the current state values comprise hashes of values indicating configuration and component information of the TPM.

9. The system of claim 6, the operations further comprising: updating the current state values from their initial values in the one or more registers.

10. The system of claim 6, wherein during another secure boot up process, the operations performed by the TPM comprise:
- attempting a login of the secure system using the PIN value associated with the secure system;
- determining, based on the attempted login, that the key exists in association with the secure system;
- determining whether the current state values in the one or more registers are the same as during the attempted initial login at the secure boot up process;
- calculating, based on a determination that the current state values are not the same, a second HMAC value using the key; and
- generating, based on the second HMAC value, a second authentication login token for the secure system.

11. The system of claim 10, wherein the second authentication login token is different than the authentication login token.

12. The system of claim 10, wherein the second HMAC value is different than the HMAC value.

13. The system of claim 12, wherein the operations further comprise: generating, based on a determination that the current state values are not the same as during the attempted initial login at the secure boot up process, another key that is associated with current state values of the TPM that are maintained by the one or more registers during the other secure boot up process.

14. The system of claim 6, wherein the registers comprise PCR registers.

15. The system of claim 6, wherein the secure system comprises a data store or database.

16. The system of claim 6, wherein the secure system comprises a computer server.

17. The system of claim 6, wherein the secure system is configured to perform operations on a function-by-function level based on authentications from the TPM.

18. The system of claim 17, wherein the operations comprise a software program, an application, a transaction, an execution of a smart contract, or an execution of a cryptocurrency exchange over one or more secure networks.

19. The system of claim 6, wherein the TPM is configured to authenticate operations performed on the secure system, the operations comprising an execution of an enterprise key management (EKM) solution, signing a certificate as part of the EKM solution, or validating a certificate to be authentic as part of the EKM solution.

20. The TPM of claim 1, wherein the TPM is configured to authenticate operations performed on the secure system, wherein the operations are associated with an EKM solution.

* * * * *